Oct. 1, 1968  K. H. FULMER ETAL  3,403,515
BRAKE MEANS

Original Filed June 12, 1964  2 Sheets-Sheet 2

INVENTORS
KEITH H. FULMER
FRED E. GOERKE.
BY Richard G. Geib
ATTORNEY

United States Patent Office 3,403,515
Patented Oct. 1, 1968

3,403,515
BRAKE MEANS
Keith H. Fulmer and Fred E. Goerke, South Bend, Ind., assignors to The Bendix Corporation, a corporation of Delaware
Continuation of application Ser. No. 374,771, June 12, 1964. This application Oct. 24, 1966, Ser. No. 588,935
10 Claims. (Cl. 60—54.5)

ABSTRACT OF THE DISCLOSURE

This patent will teach a method of providing a different travel requirements for hydraulic controls that will allow for fluid displacement, as the hydraulic control is being positioned from its maximum travel condition to its minimum travel condition so that the control does not inadvertently actuate its attendant apparatus when travel conditions of its operating members is being varied.

Related applications

This application is a continuation of my parent application Ser. No. 374,771 filed June 12, 1964, now abandoned, and is an improvement over my common assignee's U.S. Patent No. 3,188,796.

Summary

This invention relates to a brake mechanism for power brake system, which is provided with means to increase the travel of a brake pedal.

With the advent of full power braking has come the decreased brake pedal travel. In some cases, such small travel may not allow enough foot power to operate the brakes when the power failure has occurred. It is, therefore, a principal object of our invention to provide a foot pedal for controlling the power brake, wherein the travel of the brake pedal may be increased to at least the conventional distance, whenever there is a power failure to provide the necessary leverage for foot operation during the power failure.

It is also an object of this invention to utilize a power brake system fluid to decrease brake pedal travel so that, as the fluid supply diminishes, the pedal travel is increased.

It is another object of this invention to provide a brake operating mechanism, wherein a low pedal is provided for operation of a power brake system, and wherein the pedal automatically moves to a higher position when the power has failed or during a power "run-out" as the brakes are being applied.

It is a further object of this invention to provide a means for balancing system pressure throughout the transition of the pedal from a high manual position to a low power position.

Drawing description

Other objects and advantages of our invention will be observed from the following description of the accompanying drawings in which:

FIGURE 3 is a sectional view of the means for balancing pressure in the brake system during transition of the brake pedal.

Detailed description

Figure 1:
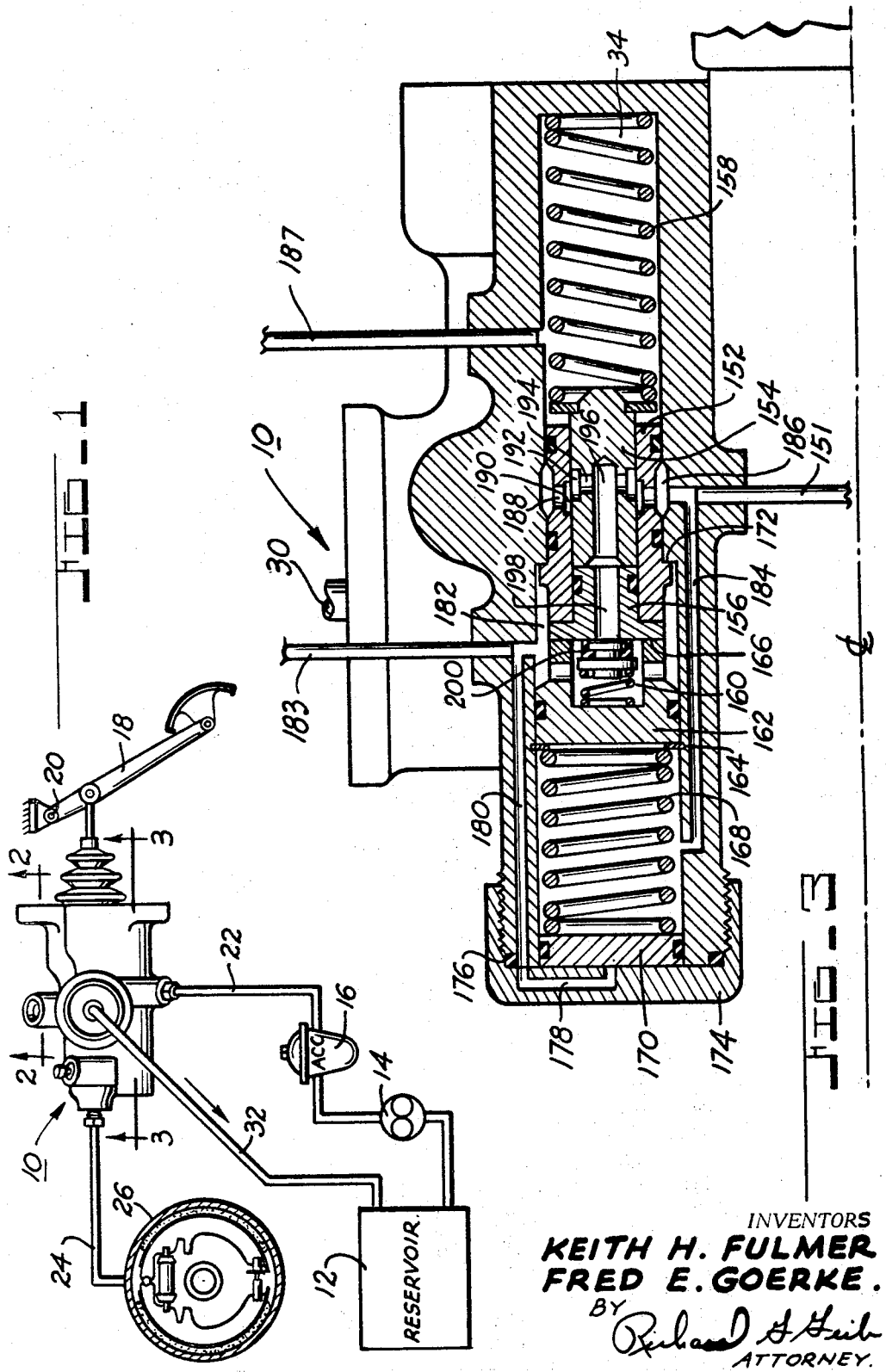
FIGURE 1 is a schematic presentation of a hydraulic power brake system in which our invention can be utilized.

Now with particular regard to FIGURE 1, we show a power brake apparatus 10 such as will be utilized in a hydraulic power system. It is to be understood, however, that the principles of our invention are equally applicable to other types of power systems. The power brake apparatus, as shown, also includes a fluid reservoir 12, a pump 14 and an accumulator 16 for supplying pressurized fluid to the power brake apparatus 10.

Generally speaking, as a brake pedal 18 is depressed within an associated vehicle about its pivot 20 to the vehicle structure, the power brake apparatus 10 will schedule a flow of fluid supplied from the accumulator 16 by means of a conduit 22 through the power brake apparatus to another conduit 24 leading to a wheel brake mechanism 26 for the associated vehicle; and upon release of the brake pedal 18, fluid will be communicated internally of the power brake apparatus 10, as will be hereinafter explained, to a reservoir cavity 28 therein thence by means of a port 30 and conduit 32 to the fluid reservoir 12.

Figure 2:
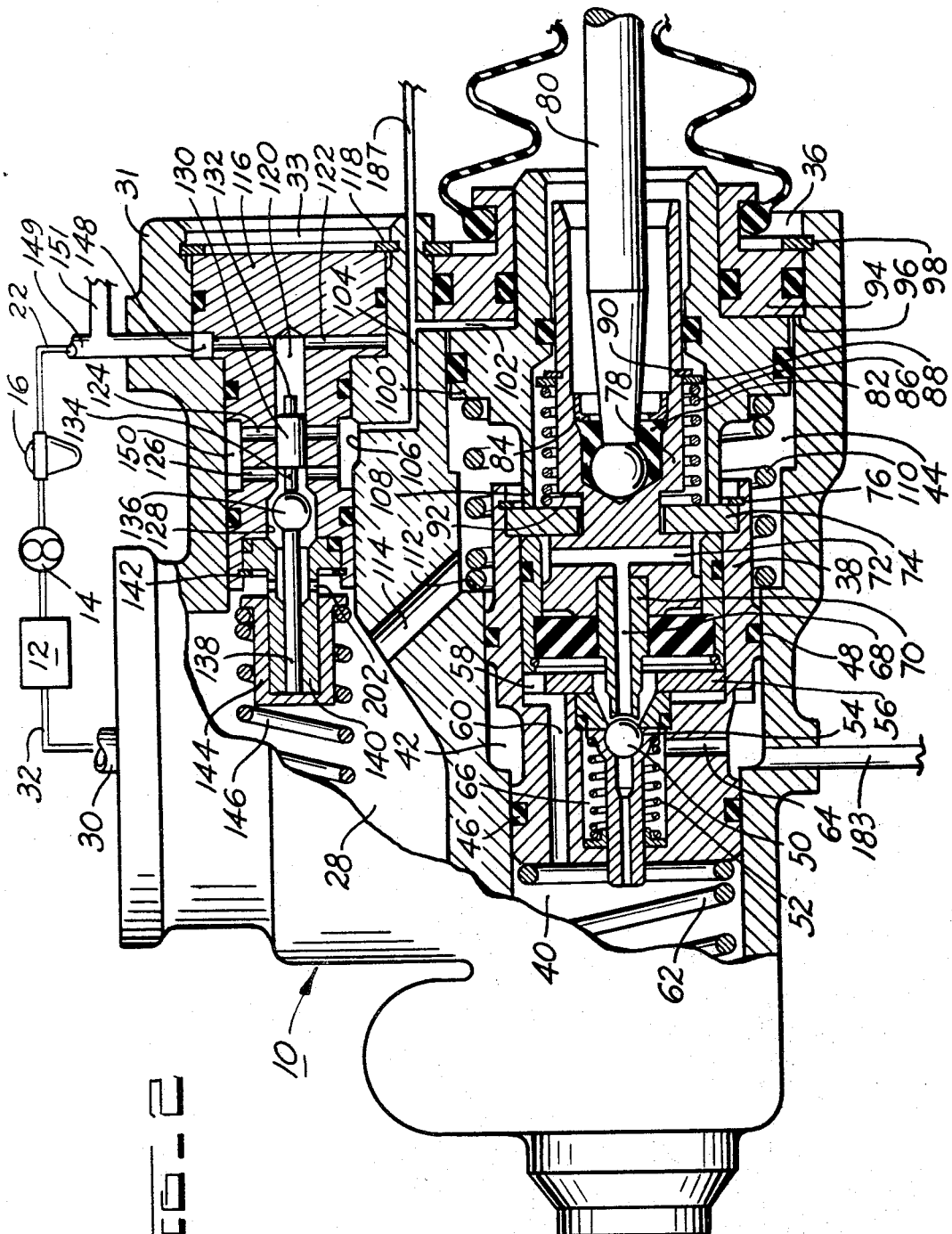
FIGURE 2 is a sectioned view of a hydraulic power brake mechanism such as may be utilized in the schematic presentation of FIGURE 1.

The power brake apparatus 10, as seen in FIGURE 2, consists of a housing 31 suitably bored to provide for the reservoir cavity 28 and valve chambers 33 and 34 as well as a control chamber 36 of stepped design. In addition, the housing is preferably of cast construction and internal passages are drilled for fluid flow between chambers as will be hereinafter described with reference to the external piping seen in FIGURES 2 and 3.

We have slidably mounted a piston or movable wall 38 of stepped design within the control bore 36 to divide the bore into a first variable volume chamber 40, an intermediate variable volume chamber 42 and a rear variable volume chamber 44 that are prevented from communication with each other around the piston by means of seals 46 and 48 on the periphery of the piston. The piston carries a ball valve 50 biased by a spring 52 to abut a valve seat 54 held within the cavity by a square section retainer 56 which is partially cut away, as at 58, so that when the valve 50 is off the seat 54, fluid may be communicated to passage 60 in the piston 38 leading to the forward variable volume chamber 40. In addition, the piston 38 is biased to the rear of the bore 36 by a spring 62 compressed between the forward face of the piston and the end of the bore. Fluid entering the power brake apparatus 10 by means of the conduit 22 is introduced to the chamber 42 and by means of a passage 64 in the forward portion of the piston 38, the fluid is allowed to enter a cavity 66 containing the ball valve and valve seat aforementioned.

In the position shown, the chamber 40 is open to the passage 60 which communicates by means of the opening 58 in the retainer 56 to a passage 68 within a valve stem 70. As seen, the valve stem opens to radial passages 72 that lead to the rear variable volume chamber 44 via an opening in a split ring 74 held to the piston by a snap ring 76.

The snap ring 76 also serves to locate a connector 78 for a control rod 80 and the valve stem 70. As seen, the valve stem 70 may be press fitted into the connector 78; whereas the control rod 80 is held by means of the more familiar rubber grommet 82 and metal retainer 84. In order to maintain the valve stem 70 from contacting the ball valve 50 in the non-actuated condition, we have inserted a spring 86 between the split ring 74 and a spring retainer 88 held on the connector 78 by a snap ring 90. In addition, the connector 78 is formed with a shoulder 92, that is in the non-actuated condition, spaced a predetermined distance from the split ring 74 so as to allow the control rod 80 to move the valve stem 70 without moving the piston 38 for a predetermined distance, and thereafter, without increasing force on the valve mechanically, unite with the piston 38 to move it by direct connection through the shoulder 92 abutting on the split ring 74. As seen, the control bore 36 is closed to the rear by means of a collar 94 held on a shoulder 96 formed about the control bore 36 in the housing 31 by a snap ring 98.

Within the chamber 44 we have mounted a piston or pressure responsive device, as it may be termed, 100 that separates the chamber 44 into a forward portion and a rear portion 102 between the piston 100 and the collar 94. The rear portion 102 is communicated by a passage 104 in the housing 31 to the valve chamber 33 adjacent a groove 106 provided therein. As seen, the piston 100 is in its rearmost position abutting on the collar 94 and having its forwardmost extension 108 of sufficient length to contact the split ring 74, even though the piston 100 is resting on the collar 94 due to the force of a spring 110 compressed between the piston 100 and a shoulder 112 of the control bore 36. In such position, the control rod 80 is forced to its maximum projection from the control bore 36. However, as will be described hereinafter in more detail, as the piston 100 moves inwardly of the control bore 36, the control rod 80 will be carried along to lower the position of the brake pedal 18.

In order to prevent pressure build-up from hindering inward movement of the piston 100, a passage 114 is provided between the chamber 44 and the reservoir cavity 28 which also serves to communicate the return of pressure fluid from the wheel brakes 26 upon release of the brake pedal 18, as aforementioned.

The valve chamber 33 is closed at one end by means of a plug 116 held in position by a snap ring 118, which plug is formed with an axial passage 120 terminating at a rearward end in radial passages 122 and opening to intermediate radial passages 124 and 126 before opening into a valve cavity 128. Within the axial passage 120 we have placed a valve spool 130 provided with small diameter projections 132 and 134 at each end thereof. We have also mounted a ball valve 136 in the valve cavity 128, that is operatively connected to the projection 134 of the valve spool 130 in that it is placed between this projection and a rod 138 slidably carried by a sleeve 140 held to the plug 16 by a snap ring 142. A hat-shaped spring retainer 144 is slidably fitted to the sleeve 140 and adapted to abut on the rod 138 such that the ball valve 136 is biased by a spring 146 to abut on the projection 134. As seen, the spring 146 is compressed between a wall of the reservoir cavity 28 and the hat section 144. The radial passage 122 terminates in a chamber 148 that is connected by means of an internal passage (shown as an external conduit 149 in FIGURE 2) to the inlet receiving fluid from the conduit 22 for the power brake apparatus 10. In addition, the radial passages 124 and 126 open into an intermediate chamber 150 that opens into the groove 106 and, consequently, to the internal passage 104 leading to the portion 102 to the rear of the piston 100.

The valve chamber 34 in FIGURE 3 is provided with a shut-off valve assembly comprising a sleeve 152, a valve spool 154, and a collar 156. A spring 158 is operatively connected to the valve spool to position the valve spool within the sleeve 152. As seen, the spring 158 is compressed between the end of the valve chamber 34 and the valve spool 154, which end is communicated by means of the internal passage (shown as an external conduit 187 in both FIGURES 2 and 3) to the portion 102 of chamber 44 that is open by means of the internal passage 104 to the chamber 150. A spring 160 is compressed between a poppet valve 200 and a plug 162 held in place by a snap ring 164. The snap ring positions the shut-off valve assembly against a shoulder 172 of the valve cavity 34. The plug is adapted to abut on the sleeve, as at 166, such that a spring 168 is compressed between a piston 170 and the plug 162. The piston 170 is, in absence of a fluid pressure differential thereacross, forced by the spring 168 to abut an end cap 174 closing the valve cavity 34 at the other end thereof, which end cap is provided with appropriate seal means 176 and with a passage 178 that is arranged to communicate with a passage 180 in the housing 31 that terminates in a chamber 182 to one side of the valve sleeve 152. The chamber 182 is connected by an internal passage in the housing (shown as an external conduit 183 in both FIGURES 2 and 3) to the variable volume chamber 42. In addition, a passage 184 is provided to communicate with a chamber 186 intermediate of the sleeve 152. The chamber 186 receives fluid from the inlet by means of a branch portion of the internal passage in the housing 31 (shown as an external conduit 151 in both FIGURES 2 and 3). Chamber 186 is open by means of radial passages 188 to a groove 190 in the sleeve 152 that is arranged to cooperate with a groove 192 in the valve spool 154. Furthermore, the groove 192 in the valve spool is opened by means of radial passages 194 to an axial passage 196 that in turn communicates with an axial passage 198 in the collar 156, closed by a poppet valve 200. It should be noted at this juncture that the valve seat 54 is provided with an angled opening in order to allow for faster fluid compensation for chamber 40 upon release. It has been previously necessary to provide additional compensation valving to accomplish the necessary fluid replenishment.

*Operation*

In operation, an operator of a motor vehicle will depress the brake pedal 18 to cause the valve stem 70 to crack the ball valve 50 from the valve seat 54. This will allow fluid pressure within the chamber 42 to flow into the chamber 40 and to the brakes 26 by means of conduit 24. However, the pressure being supplied to chamber 42 enters by means of passage 149 to chamber 148. It, if of sufficient magnitude, displaces spool 130 to close passage 126 and open chamber 148 to passage 124. This fluid pressure then flows into passage 104 to portion 102 of chamber 44 and by means of passage 187 to the valve cavity 34 on the right side of the sleeve 152 and valve spool 154, as seen in FIGURE 3. As the pressure across the spool valve 154 is equal in that the pressure in the conduit 187 is equal to that in the conduit 151, at this time, the spool valve 152 will register the passage 194 with the passage 188 to open the inlet communication with the chamber 186. This pressure will react upon the check valve 200 to force it away from the seat on the collar 156 until the pressure in the chamber 182 reaches the same value as that in the chamber 186. As may be surmised, the fluid flowing by the valve 200 into the chamber 182 is communicated to chamber 42 as by passage 183.

When the pressure is acting on the spool 132 it forces the spool to move the ball 136 towards a seat in sleeve 140. The spool thus closes passage 126 to cut off communication between a plurality of radial passages 202 in the sleeve 140 with the passage 126. Next, the spool opens the passage 124 which then ports high pressure fluid to the chamber 150 and by means of passage 104 to the portion 102 behind the piston 100. This will force the piston 100 to move inwardly of the bore 36, to move the piston 38 inwardly simultaneously decreasing volume in chamber 42 as explained hereinafter also and thus lower the position of the brake pedal 18.

It may be thus surmised that upon a failure in the pressure system such as by a failure in line 22, accumulator 16, or pump 14 the spool 130 will not be so activated and the spring 110 will cause the piston 100 to assume the position shown in FIGURE 2 whereby the brake pedal 18 is in its uppermost position.

The pressure acting on the poppet 200 will cause it to open to port fluid to the passages 180 and 178 so that the piston 170 will be pressure suspended, whereby the spring 168 will cause piston 170 to assume the position shown in FIGURE 3. However, as the system pump 14 builds pressure to the "pop-down point," the piston 170 is balanced as aforementioned, and as the pedal "pops-down" pressure begins to build in the chamber 42 which is communicated to the cavity 182 to close the poppet 200 and stroke the piston 170 to allow inward movement of the piston 38. We have, therefore, eliminated a need for a pressure relief in the piston 38, as has been heretofore deemed necessary, which elimination provides a substantial economic savings. It will thus be appreciated that we have provided an accumulator for the fluid being displaced from the chamber 42 as the piston 38 is moving to its "pop-down" position. However, it should be recognized that during the transition from the "pop-down" position to the "pop-up" position wherein the brake valve 10 may be manually actuated, that it is highly undesirable to have a great magnitude of fluid pressure being ported by the valve 50 through the chamber 40 to the vehicle brakes. Therefore, when the spool 130 moves back to communicate the reservoir 28 with the portion 102 of the chamber 44, as would be occurring during a failure of pressure in the chamber 148, the valve cavity 34 to the right of the valve 154 will be similarly ported to reservoir pressure via the internal passage shown as the external conduit 187. It may thus be appreciated that the pressure within the portion 102 of the chamber 44 will not be completely depleted until the pressure within the chambers 182 and 42 has reached a value where the position of the brake pedal for manual operation will not supply a pressure to the brakes that will be unexpected. Furthermore, it should be realized that the transition from the power position of the brake pedal to the manual position of the brake pedal will be gradual.

Thus, it is believed that the above structure clearly accomplishes the objects of our invention as set forth, as well as other objects and advantages apparent to those skilled in the art to which our invention relates. We, however, cannot overemphasize that the foregoing description is but one structural arrangement of many which may be utilized in accomplishing these, our principles. Therefore, we do not intend to be limited by this structure but rather by the scope of the appended claims.

We claim:

1. In a power brake apparatus having a housing and a manually controlled brake valve and pressure intensifying means therein within a means including a pressure responsive device subjected to high pressure fluid which is operatively connected to said valve and intensifying means, a valve means operatively connected to said pressure responsive device, said valve means controlling communication of high pressure fluid to the brake valve, and a spring means operatively connected to said pressure responsive device and arranged to oppose the effect of the high pressure fluid on said device such that upon failure of said high pressure fluid said device will increase the operating travel for said manually controlled brake valve and pressure intensifying means, said apparatus being improved by a means to facilitate the operation of said pressure responsive device comprising:

a pressure regulating valve operatively connected to said valve means and said brake valve and arranged to be in fluid communication with the high pressure fluid supplied to the brake valve to limit the pressure of this fluid to a preselected level as system pressure drops; and an accumulator means having a pressure responsive member operatively connected to said brake valve to be in fluid communication with the high pressure fluid supplied to the brake valve via the regulating valve on one side and operatively connected on the other side to an inlet chamber for the pressure intensifying means so that the other side of said pressure responsive means allows for the ingestion of fluid displaced by inward movement of the pressure intensifying means as said pressure responsive device moves to decrease the operating travel of the manually controlled brake valve and pressure intensifying means.

2. In a power brake apparatus according to claim 1 wherein the brake valve is characterized as including:
a ball valve, and
a valve seat having an angled passage to increase fluid flow through said valve means.

3. A power brake means including a fluid pressure source and comprising:
a power brake control mechanism having a fluid pressure control valve within a movable wall operatively connected to a manual control means such that said control means sequentially operates said valve and said wall to deliver a pressurized fluid;
a pressure responsive means operatively connected to said movable wall and said manual control means in fluid communication with said fluid pressure source to position said movable wall; and
a variable volume means operatively connected to said fluid pressure control valve and said pressure responsive means and having a pressure responsive device subjected to fluid pressure from said control valve on one side and to fluid pressure from said fluid pressure source on the other side to thereby allow said movable wall to be positioned.

4. A power brake means according to claim 3 wherein said valve has means including a valve member and a valve seat having an opening internally of the valve seat to be controlled by the valve member, which opening increases in area as it projects away from said valve member and valve seat to allow a high rate of fluid flow when said valve member has been displaced from said valve seat by said manual control means.

5. A hydraulic power brake system comprising:
a hydraulic fluid pressure source;
a vehicle brake means;
a means to communicate said fluid pressure source to said brake means including,
a housing having a plurality of cavities therein,
a first piston operatively arranged in said housing, said first piston having an internal cavity communicated by radial passages to a first variable volume chamber receiving said hydraulic fluid pressure,
a valve means closing said cavity to control said fluid pressure, said valve means including a valve seat and a ball valve,
a valve stem arranged in said housing to control the relationship of said ball valve and said valve seat, said valve stem being drilled to provide a return passage for said hydraulic fluid via a reservoir cavity in said housing to said fluid pressure source,
a second piston in said housing and operatively connected to said first piston,
a control means to create a pressure differential across said second piston to cause inward movement of said piston,
a second variable volume chamber adapted to receive fluid displacement from said first chamber by said first piston during said inward movement thereof; and
a control mechanism opertively connected to said valve stem and said second piston whose travel is regulated by said second piston.

6. A hydraulic power braking system according to claim 5 and further comprising a pressure limiting means interposed between said source and said first chamber.

7. In a hydraulic control system having a fluid pressure source and a motor to be actuated thereby, a control means;
a first pressure responsive valve operatively connected to said fluid pressure source;
a manually controlled valve means in fluid communication with said fluid pressure source via said first pressure responsive valve means for controlling the supply of said fluid pressure source to said motor;
means to position said manually controlled valve means for minimum and maximum travel for powered and non-powered operation of said motor thereby; and
accumulator means for receiving fluid displaced by said manually controlled valve means when it is being positioned for minimum travel for power actuation of said motor.

8. In a hydraulic control system according to claim 7 wherein the control means may be further characterized as comprising a third pressure responsive valve means for limiting the supply of fluid pressure from said fluid pressure source to said manually controlled valve means whenever said first pressure responsive valve means is not capable of supplying adequate fluid pressure to said manually controlled valve means.

9. A power brake control means comprising:

a housing having a control bore, a first valve bore, a second valve bore and a reservoir chamber with fluid passage means connecting an inlet port of said housing to both said first and second valve bores, said first valve bore to said second valve bore via said control bore and said second valve bore to said control bore, said control bore having outlet means including a return port and a discharge port with the return port open also to said first valve bore;

a piston in said control bore creating a front variable volume chamber, an intermediate variable volume chamber and a rear variable volume chamber in said control bore, said piston having a chamber therein communicated to said intermediate chamber and said rear chamber and a passageway communicating said front chamber and said rear chamber;

first valve means in said chamber of said piston, said first valve means controlling fluid flow between said intermediate chamber and said rear chamber;

a valve operating member operatively connected to said valve means and said piston to open said valve means upon actuation of said member and thereafter operate said piston;

a movable wall in said rear chamber and operatively connected to said piston and said valve operating member for positioning same in said control bore, said wall dividing said rear chamber into first and second portions one of which is open to a portion of said fluid passage means communicating said first valve bore to said second valve bore;

second valve means in said first valve bore operatively arranged between the communication therewith of said inlet port and said return port, said second valve means being pressure responsive to control development of pressure differentials across said wall for positioning said piston and valve operating member in said bore; and fluid displacement means in said second valve bore including a pressure responsive piston subjected to pressure from said intermediate chamber and from said inlet port to permit fluid to be displaced from said intermediate chamber upon the inward positioning of said piston and said valve operating member by said wall.

10. A power brake control means according to claim 9 and further comprising third valve means in said second valve bore operatively arranged to be responsive to a pressure differential between said inlet port and that in the portion of said passage means communicating said first valve bore and said second valve bore, said third valve means operatively restricting communication from said inlet port to said intermediate chamber whenever said wall has positioned said piston and valve operating member for maximum travel in said control bore.

References Cited
UNITED STATES PATENTS

| | | | |
|---|---|---|---|
| 3,188,796 | 6/1965 | French et al. | 60—10.5 |
| 3,267,663 | 8/1966 | Schultz | 60—10.5 |

MARTIN P. SCHWADRON, *Primary Examiner.*

ROBERT R. BUNEVICH, *Assistant Examiner.*